US000001378H

United States Statutory Invention Registration [19]

[11] Reg. Number: H1378

Crane et al.

[43] Published: Nov. 1, 1994

[54] ELECTROMAGNETIC FASTENERS

[75] Inventors: Randolph W. Crane; Donna J. Marts, both of Idaho Falls, Id.

[73] Assignee: The United States of America as represented by the Department of Energy, Washington, D.C.

[21] Appl. No.: 913,094

[22] Filed: Jul. 14, 1992

[51] Int. Cl.[5] ..... B66C 1/04; B25J 15/10

[52] U.S. Cl. ..... 414/737; 244/159; 244/161

[58] Field of Search ..... 414/737, 786; 901/40; 294/65.5; 244/159, 161, 173; 180/2.2

[56] References Cited

U.S. PATENT DOCUMENTS

| | | | |
|---|---|---|---|
| 3,672,999 | 6/1972 | Barbera | 244/173 X |
| 4,181,188 | 1/1980 | Dessert | 180/2.2 |
| 4,323,329 | 4/1982 | Chlad | 294/65.5 X |
| 4,921,292 | 5/1990 | Harwell et al. . | |
| 4,921,293 | 5/1990 | Ruoff et al. . | |
| 5,125,601 | 6/1992 | Monford, Jr. | 244/161 |
| 5,145,227 | 9/1992 | Monford, Jr. | 244/161 X |

FOREIGN PATENT DOCUMENTS

| | | | |
|---|---|---|---|
| 894666 | 12/1981 | U.S.S.R. | 901/40 X |

*Primary Examiner*—David H. Brown

*Attorney, Agent, or Firm*—Mark P. Dvorscak; Robert J. Fisher; William Moser

[57] ABSTRACT

An electromagnetic fastener for manipulating objects in space uses the magnetic attraction of various metals. An end effector is attached to a robotic manipulating system having an electromagnet such that when current is supplied to the electromagnet, the object is drawn and affixed to the end effector, and when the current is withheld, the object is released. The object to be manipulated includes a multiplicity of ferromagnetic patches at various locations to provide multiple areas for the effector on the manipulator to become affixed to the object. The ferromagnetic patches are sized relative to the object's geometry and mass.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROMAGNETIC FASTENERS

CONTRACTUAL ORIGIN OF THE INVENTION

The U.S. Government has rights in this invention pursuant to Contract No. DE-AC07-76ID01570 between the Department of Energy and EG&G Idaho, Inc.

BACKGROUND OF THE INVENTION

This invention relates generally to an apparatus and method for manipulating an object or workpiece in a space environment. More specifically, the present invention relates to a robotic manipulator which uses the magnetic attraction of various metals to grasp and release objects.

Advanced space projects will require various structures to be constructed in space. For advanced projects such as exploring the planets or building a space station, there will be a need for cargo boxes and other building supplies to be used and manipulated in space. Construction techniques that minimize the amount of time and number of people needed to perform the construction will best serve this need.

Much of this construction requires only a simple grasp and release technique of the objects to be manipulated or constructed. Current designs for grasping such objects for positioning or retrieval employ a dexterous hand. For example, U.S. Pat. No. 4,921,293, discloses a robotic hand having a plurality of fingers. While this hand provides several degrees of freedom and allows for complex manipulations, it may be complex and excessive for simple grasp and release processes.

Simpler grasp and release devices however, can also be somewhat complex. U.S. Pat. No. 4,921,292 discloses a magnetic attachment mechanism that interfaces with a manipulator arm of a robot to grasp and release objects in space using magnetic attraction forces. Permanent magnets in a stator-rotor relationship enable an on and an off position to attract or repel the object to be grasped. The object to be grasped includes a ferrous plate of magnetic material as well as a guide means cooperable with a guide means on the attachment mechanism to guide the magnet to the object to be grasped. Since permanent magnets are employed, even in the off position there are still magnetic attraction forces so the arm must be pulled away from the object being grasped.

Simple grasp and release manipulations may be better discharged by a less complex means requiring less sophisticated hardware and less skill and training to operate.

Accordingly, it is an object of the present invention to provide an apparatus capable of simply grasping and releasing objects in a space environment.

Another object of the present invention is to provide a space-based manipulator which minimizes the amount of time and the number of people needed to perform grasp and release operations on objects in space.

Yet a further object of the present invention is to provide electromagnetic manipulating means which exploits the gravitational forces in space.

SUMMARY OF THE INVENTION

This invention includes an apparatus for manipulating an object in space. The object to be manipulated has a magnetically permeable area. An end effector is attached to a robotic manipulating system and includes an electromagnet such that when current is supplied to the electromagnet, the object is drawn and affixed to the end effector, and when the current is withheld, the object is released. The magnetically permeable area on the object to be manipulated can include a ferromagnetic patch which is sized relative to the object's geometry and mass. The object to be manipulated is provided with a multiplicity of ferromagnetic patches at various locations to provide multiple areas for the effector on the manipulator to become affixed to the object. The manipulator can also include solar panel covered arms to supply power to the effector.

A method for manipulating an object in a space environment can comprise providing a magnetically permeable area on the object to be manipulated; positioning a manipulator having an end effector with a metal complementary to the metallic patch toward the patch; supplying an electric current to the end effector to cause the object to be drawn and affixed to the manipulator; and, deactivating the current in the end effector to release the object.

DESCRIPTION OF THE DRAWINGS

The above-mentioned and other features of the invention will become more apparent and be best understood, together with the description, by reference to the accompanying drawings, in which.

DETAILED DESCRIPTION OF THE INVENTION

Figure 1:
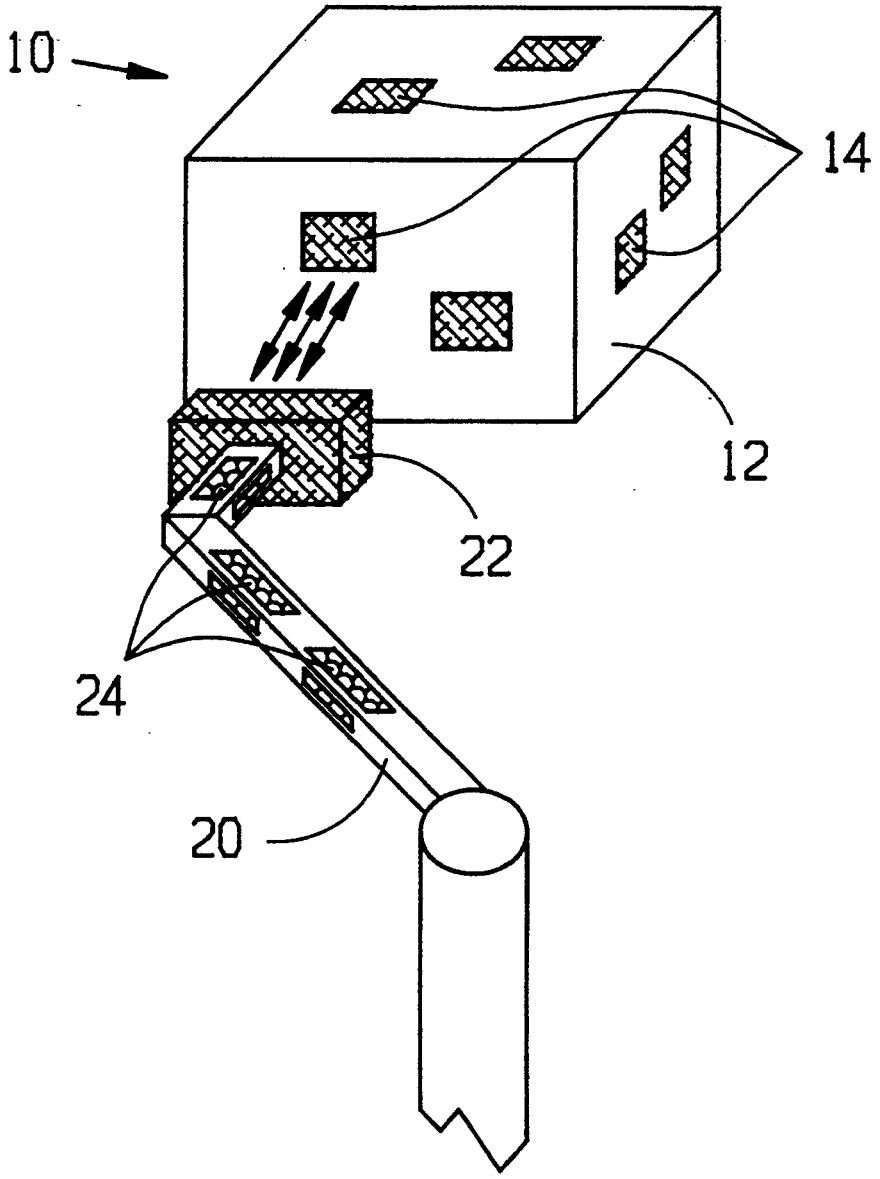
FIG. 1 shows a depiction of an electromagnetic fastening apparatus for manipulating an object in space in accordance with the present invention; and, FIG. 2 shows a diagram of a space construction system employing the electromagnetic fastening apparatus depicted in FIG. 1.

Referring to FIG. 1, an electromagnetic fastener system 10 in accordance with the present invention is depicted. The system 10 includes an object 12 in space that is to be grasped or manipulated. A plurality of magnetically permeable areas 14 are located at various places on the object 12. A space manipulator arm 20 has an end effector 22. The end effector 22 includes an electromagnet having a complementary metal to the magnetically permeable areas 14 on the object 12.

It is preferred that the ferromagnetic areas 14 on the object 12 be ferromagnetic patches. The patches attract the complementary metal on the end effector when an electric current is supplied. The patches are sized relative to the physical geometry and mass of the object 12. The number of patches to be placed on an object 12 is determined by both the load requirements and available electromotive force source, both of which are application dependant, as well as the object's overall size, geometry, and the desired ease of the manipulation. AT least one patch is required on each object, however, one patch on each side of the object will facilitate and quicken the positioning function. Objects which are either quite wide or long may be best suited for several patches along the long dimension to allow greater flexibility in where the object can be grasped. The lack of gravitational forces in space allows the metal to metal surface area of the patches and the end effector to remain small compared to the object 12 being manipulated. Preferred materials for the ferromagnetic patches include rare earth ferromagnetic compounds, permalloy, cobalt/iron compounds, garnets and preferably magnetic amorphous films that are easily formed and bonded to surfaces. The end effector 22 is preferably made from a ceramic, a carbon/carbon composite, or light weight aluminum alloy.

When electric current is supplied to the electromagnetic effector 22 to energize the electromagnet, the effector arm is inclose proximity to one of the ferromagnetic patches 14, the attractive forces will bring the two together: the object 12 is drawn and affixed to the end effector. When the current is withheld or reversed, the object is released.

The space manipulator arm 20 can also include a plurality of solar cells 24. The solar cells 24 can be used as an additional power source to reduce the need to electric power to the manipulator. It is preferred that the arm 20 be constructed from a carbon/carbon composite or a fiber reinforced aluminum to reduce mass. The end of the manipulator arm 22 is the only component of the manipulator having a ferromagnetic material.

Figure 2:
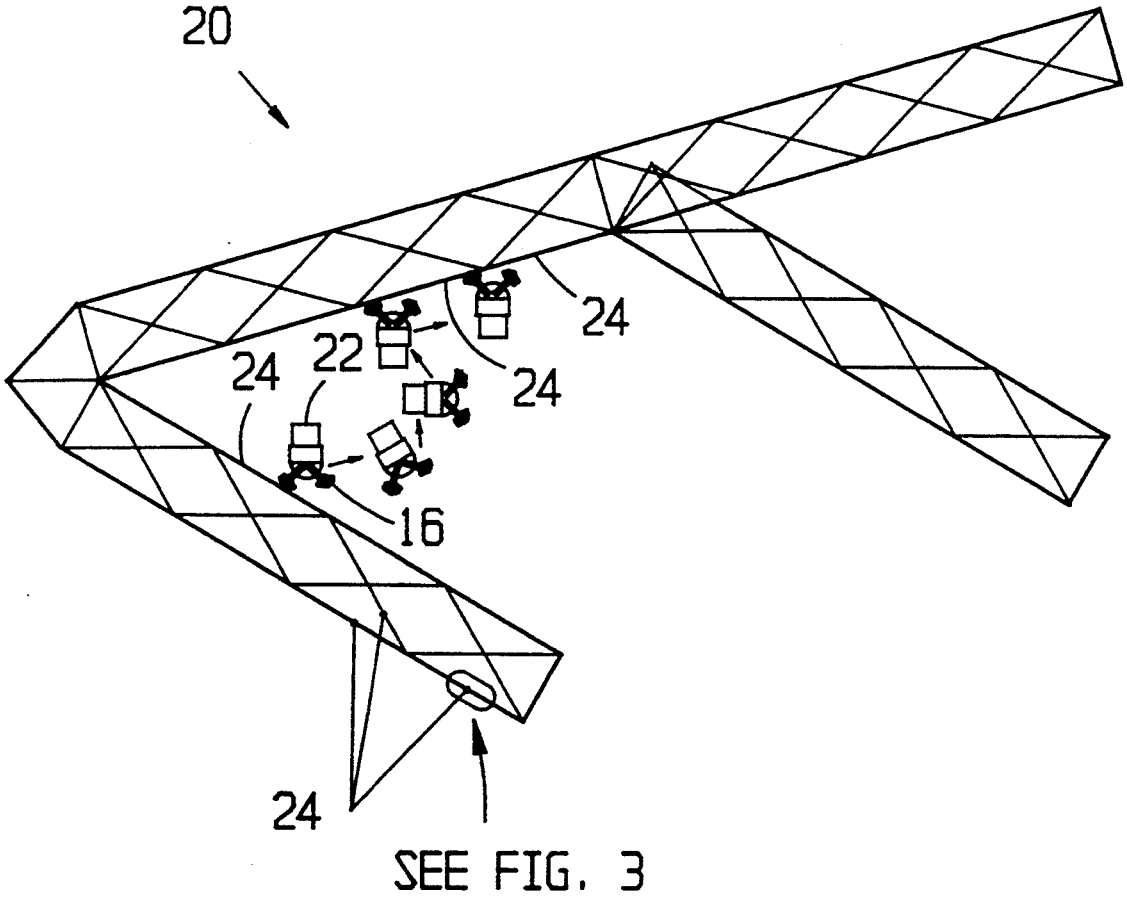
Figure 3:
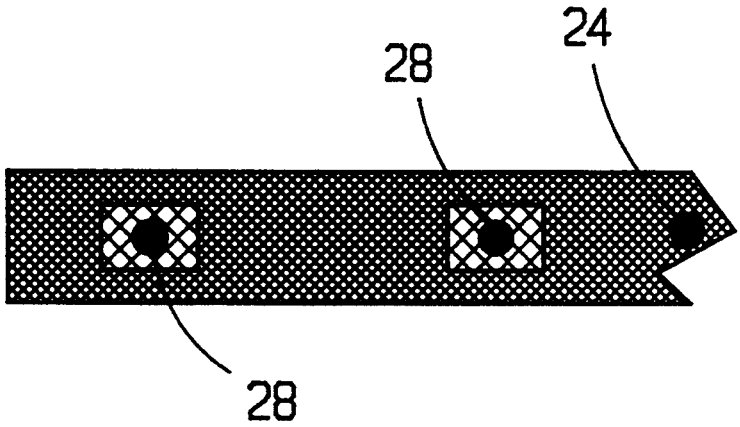
FIG. 3 shows a detailed view of the electromagnetic apparatus shown in FIG. 2.

It is contemplated that the electromagnetic fastener system 10 will be used as a component in a space construction system, integrated with computer controlled manufacturing and radar and transponder communications. Referring to FIG. 2, an electromagnetic space construction system 20 is shown. The system 20 includes a robot 22 having an electromagnetic end effector 16 as described above. The robot 22 is also equipped with a rechargeable power supply, a computer interface, and a radar communications system. System 20 also includes a multiplicity of construction objects 24. The construction objects 24 have a multiplicity of ferromagnetic patches 28 which are identical to the ferromagnetic patches 14 described previously. The construction pieces may also be provided with bar codes for identification and transponders for locational information (both of which are not specifically shown). A computer control system (not shown) enables an operator, who is either land based or spaced based, to instruct the robot to perform the construction manipulation.

The integration of the components included in the system 20 is initiated by the computer defining the environment that the robot 22 will perform the task in, identifying the objects 24 that the robot will need to use, and instructing the robot 22 on where the objects 24 will be placed. The robot 22 determines its environment using the transponders from known object locations and triangulation. Objects 24 for the task are found through the use of the transponders and are retrieved by the robot. Once the objects are obtained by the robot using the electromagnetic end effector 16, they can be assembled as instructed by the operator.

This invention also provides means for robot propulsion through the construction system 20. The ferromagnetic patches 28 can be used as "hand-holds", allowing the robot 22 to move or crawl along a construction member 24 by the supply of electrical current to the electromagnetic end effector 16. When the current supply is reversed, the robot expels itself from a ferromagnetic patch 28, and then reverses the current again to attract itself to another patch 28 a short distance away. Thus, if the objects are located along the path of an already constructed segments, the robot can travel across the segment using electromagnetic catch and release techniques rather than valuable thruster power.

The foregoing description of the preferred embodiment of the invention has been presented for purposes of illustration and description. It is not intended to be exhaustive or to limit the invention to the precise form disclosed, and obviously many modification and variations are possible in light of the above teaching. The embodiment was chosen and described to best explain the principles of the invention and it practical application and thereby enable others skilled in the art to best utilize the invention in various embodiments and with various modifications as are suited to the particular use contemplated. It is intended that the scope of the invention be defined by the claims appended hereto.

We claim:

1. An apparatus for manipulating an object in space comprising:

a. a magnetically permeable area on the object to be manipulated;

b. an end effector attached to a robotic manipulating system having an electromagnet such that when current is supplied to the electromagnet, the object is drawn and affixed to the end effector, and when the current is withheld, the object is released.

2. The apparatus of claim 1 wherein the magnetically permeable area includes a ferromagnetic patch sized relative to the object's geometry and mass.

3. The apparatus of claim 2 wherein the object to be manipulated includes a multiplicity of ferromagnetic patches at various locations to provide multiple areas for the effector on the manipulator to become affixed to the object.

4. The apparatus of claim 3 wherein the manipulator includes solar panel covered arms to supply power to the effector.

5. A method for manipulating an object in a space environment comprising:

providing a magnetically permeable area on the object to be manipulated;

positioning a manipulator having an end effector with a metal complementary to the metallic patch toward the patch, supplying a current to the end effector to cause the object to be drawn and affixed to the manipulator;

deactivating the current in the end effector to release the object.

* * * * *